Feb. 3, 1925.
C. HOLLE, JR
MIRRORSCOPE
Filed Dec. 15, 1921
1,524,933
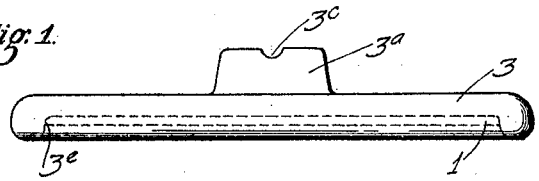
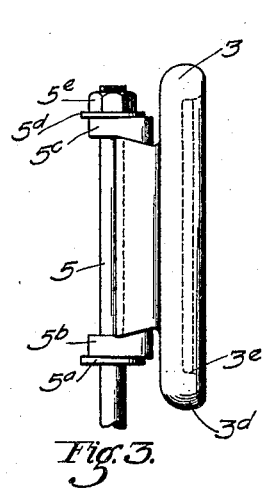
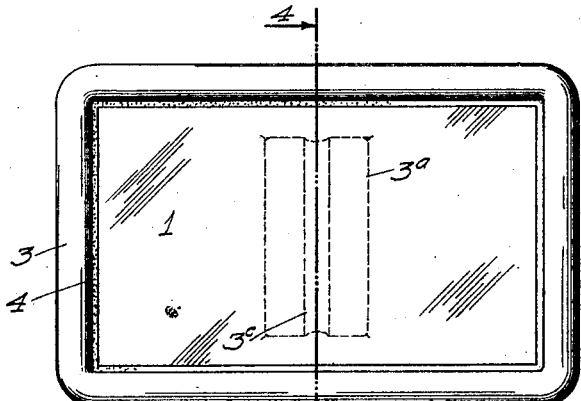
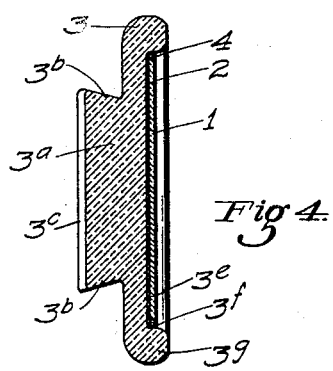
INVENTOR.
CHRISTIAN HOLLE, JR.
BY A.B.Bowman
ATTORNEY Patented Feb. 3, 1925.

1,524,933

UNITED STATES PATENT OFFICE.

CHRISTIAN HOLLE, JR., OF SAN DIEGO, CALIFORNIA.

MIRRORSCOPE.

Application filed December 15, 1921. Serial No. 522,649.

*To all whom it may concern:*

Be it known that I, CHRISTIAN HOLLE, Jr., a citizen of the United States, residing at San Diego, in the county of San Diego and State of California, have invented certain new and useful Mirrorscopes, of which the following is a specification.

My invention relates to mirrorscopes, more particularly to mirrors for automobiles to detect the presence of vehicles or other objects in the rear, and the objects of my invention are: first, to provide a mirrorscope of this class in which the mirror and its silver backing are rigidly secured in a glass casing or frame to prevent any foreign agent scratching or in any way acting on the silvering of the mirror; second, to provide a mirrorscope of this class in which the mirror is a comparatively thin glass plate because of the cost of plate glass and still retains the qualities of strength and appearance of the heavier plate; third, to provide a mirrorscope of this class in which the glass of the mirror will be protected by a bead running around the casing; fourth, to provide a mirrorscope of this class in which the casing of the mirror can be made of a simple glass casting to receive the mirror and to provide means for securing said casing to the wind-shield of an automobile; fifth, to provide novel means of supporting and securing the plate glass; sixth, to provide a mirrorscope of this class which is very simple and economical of construction, durable and which will not readily deteriorate or get out of order; and seventh, to provide a novelly constructed mirrorscope.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a top plan view of my mirrorscope; Fig. 2 is a front elevational view thereof; Fig. 3 is an end elevational view thereof showing the mirrorscope in position on a vertical, frictional swivel; and Fig. 4 is a transverse sectional view through 4—4 of Fig. 2.

Like characters of reference refer to similar parts and portions throughout the several views of the drawings.

The mirror glass 1, silvering 2, mirror casing 3, cement border 4, and mirrorscope support 5, constitute the principal parts and portions of my structure.

The glass casing 3 is the container and frame of the mirrorscope and may be rectangular, round, oval, or any other shape desired. The recess $3^e$ of casing 3 may be any desired shape and slightly larger than the mirror glass 1. It is obvious that the bottom surface of the recess $3^e$ upon which the silvering 2 is spread may be either plain or spherical as desired and the mirror glass conforming thereto for providing enlargement or reduction of the object. The mirror glass 1, as shown best in Figs. 2 and 4 of the drawings, is the same shape as the recess $3^e$ of the casing 3 and is made integral with the casing 3 by pressing the mirror glass 1 against casing 3, the silvering 2 serving as a cement. The plastic cement 4 is placed in the groove or recess between the mirror glass 1 and the walls $3^f$ of the casing 3, keeping said mirror glass firmly in a central position and against the casing and holding it rigidly. The bead $3^g$ extending around the periphery and on the mirror side of the casing serves as a protection against breakage of the mirror glass 1. The integral extended portion $3^a$ of the casing is provided with a groove $3^c$ to receive the supporting bolt 5 as shown in Fig. 3 of the drawings. At both ends of the extended portion $3^a$ and at both ends of groove $3^c$ are inclined surfaces in dove-tail fashion to receive special beveled washers $5^b$ and $5^c$. The special washer $5^b$ rests on an annular flange $5^a$ of the bolt 5 and the washer $5^d$ is clamped against the special washer $5^c$ by means of a nut $5^e$ which permits the mirrorscope to be held securely by the support 5, and at the same time permits said mirrorscope to be turned about the support 5 as a center in the position desired, thus providing a frictional support for the mirrorscope.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention what I claim as new and desire to secure by Letters Patent is:

1. A mirrorscope, including a casing provided with a recess in one side thereof, a transparent member conforming to the interior of said recess and spaced slightly therefrom, opaque material interposed between the back surface of said transparent member and the bottom of said recess, and a supporting and protecting plastic material interposed between the edges of said transparent member and the side walls forming said recess, for supporting said transparent member in position in said casing and for protecting said opaque material from moisture and dust.

2. A mirrorscope, including a casing provided with a recess in one side thereof, a transparent member conforming to the interior of said recess and spaced slightly therefrom, opaque material interposed between the back surface of said transparent member and the bottom of said recess, and a supporting and protecting plastic material interposed between said casing and said transparent member and against the edge of said opaque material, for supporting said transparent member in position in said casing and for protecting said opaque material from moisture and dust.

3. A mirrorscope, including a casing provided with a recess in one side thereof, a plate glass mirror conforming to the interior of said recess and spaced slightly therefrom, silvering interposed between the lower surface of said plate glass and the bottom of said recess and plastic material interposed between the edges of said plate glass and the side walls of said recess.

4. In a mirrorscope, a combined glass casing and frame, the frame portion thereof forming a recess, a glass plate conforming to the interior of said recess with its edges spaced slightly from said frame portion, an opaque reflecting material interposed between the back surface of said glass plate and the bottom of said recess, and a supporting and protecting plastic material interposed between the edges of said glass plate and said frame portion for supporting said glass plate in position in said combined casing and frame and for protecting said opaque reflecting material from moisture and dust.

In testimony whereof, I have hereunto set my hand at San Diego, California, this 10th day of December, 1921.

CHRISTIAN HOLLE, Jr.